United States Patent
Ponomarenko et al.

(10) Patent No.: US 12,174,904 B2
(45) Date of Patent: Dec. 24, 2024

(54) USER-SELECTABLE LINK INCLUDING MULTIPLE ROUTING LINKS

(71) Applicant: Branch Metrics, Inc., Palo Alto, CA (US)

(72) Inventors: Petr Ponomarenko, La Honda, CA (US); Karthik Kannan, London (GB); Evan Kaplan, London (GB); Eric Glover, Chappaqua, NY (US); Charles Gilliam, Seattle, WA (US); Ahmed Nawar, Mountain View, CA (US); Aaron Alejandro Lopez, San Francisco, CA (US)

(73) Assignee: Branch Metrics, Inc., Palo Alto, CA (US)

( * ) Notice: Subject to any disclaimer, the term of this patent is extended or adjusted under 35 U.S.C. 154(b) by 0 days.

(21) Appl. No.: 17/990,854

(22) Filed: Nov. 21, 2022

(65) Prior Publication Data

US 2023/0161829 A1 May 25, 2023

Related U.S. Application Data

(60) Provisional application No. 63/282,251, filed on Nov. 23, 2021.

(51) Int. Cl.
*G06F 16/955* (2019.01)
*G06F 16/954* (2019.01)
*G06F 40/134* (2020.01)

(52) U.S. Cl.
CPC ........ *G06F 16/954* (2019.01); *G06F 16/9566* (2019.01); *G06F 40/134* (2020.01)

(58) Field of Classification Search
CPC ... G06F 16/954; G06F 16/9566; G06F 40/134
See application file for complete search history.

(56) References Cited

U.S. PATENT DOCUMENTS

2012/0323898 A1* 12/2012 Kumar ............... G06Q 30/0251
707/723
2014/0129733 A1 5/2014 Klais
(Continued)

OTHER PUBLICATIONS

"How to change the default apps in Android," https://web.archive.org/web/20200807183229/https://www.androidtipsandhacks.com/android/change-default-apps-android/ Website dated Aug. 7, 2020. Accessed on Feb. 6, 2023.

(Continued)

*Primary Examiner* — Sanchita Roy
(74) *Attorney, Agent, or Firm* — RMCK Law Group PLC

(57) ABSTRACT

A non-transitory computer-readable medium includes computer-executable instructions that cause a processing unit of a user device to receive a multi-link uniform resource locator (URL), wherein the multi-link URL is associated with a plurality of routing link URLs configured to route the user device to a plurality of corresponding application pages. The executable instructions cause the processing unit to receive user selection of the multi-link URL and rank the routing link URLs based on application installation data stored on the user device, wherein the application installation data indicates whether applications for the routing link URLs are installed on the user device. The executable instructions cause the processing unit to select a final routing link URL based on the ranking of the routing link URLs and access an application page associated with the final routing link URL.

16 Claims, 14 Drawing Sheets

(56) References Cited

U.S. PATENT DOCUMENTS

2016/0357716 A1* 12/2016 Douglas ................ G06F 16/951
2018/0152528 A1*  5/2018 Gupta .................. H04L 67/535
2019/0253503 A1   8/2019 Austin et al.
2019/0260836 A1*  8/2019 Zahl ..................... H04L 63/101

OTHER PUBLICATIONS

"How to change the default program a file opens with in Windows 7," Article dated Sep. 28, 2011. Article accessed on Feb. 6, 2023 at site: https://www.bleepingcomputer.com/tutorials/change-file-association-in-windows-7/.
"Mobile deep linking - Wikipedia Article", https://web.archive.org/web/20201112015558/https://en.wikipedia.org/wiki/Mobile_deep_linkingWebsite dated Nov. 12, 2020. Accessed on Feb. 6, 2023.

* cited by examiner

USER-SELECTABLE LINK INCLUDING MULTIPLE ROUTING LINKS

CROSS-REFERENCE TO RELATED APPLICATION

This application claims the benefit of U.S. Provisional Application No. 63/282,251, filed on Nov. 23, 2021. The disclosure of the above application is incorporated herein by reference in its entirety.

FIELD

The present disclosure relates to providing linking functionality across multiple computing platforms and applications.

BACKGROUND

Software developers can develop websites and applications that are accessed by users on a variety of different platforms, such as different computing devices and operating systems. These applications and corresponding websites can provide users with different functionalities for a variety of different entities, such as consumer product entities and digital media entities (e.g., movies/songs). For example, an e-commerce application can provide consumer products for sale to users. As another example, a media streaming application can play movies or songs for a user.

Advertisers, such as application developers and other business entities, may advertise their applications, services, and products across a variety of different computing platforms. In order to efficiently advertise their applications, services, and products, advertisers may advertise to a targeted audience. Various parties (e.g., advertisers, developers, and others) may also acquire analytics regarding the performance of their advertisements and websites/applications so that they can gain a better understanding of how their advertisements and websites/applications are consumed by users on different platforms. The various parties may also acquire analytics regarding performance in order to determine proper compensation associated with user consumption of advertisements and content on the different platforms.

SUMMARY

In one example, a non-transitory computer-readable medium comprises computer-executable instructions, the computer-executable instructions causing a processing unit of a user device to receive a multi-link uniform resource locator (URL), wherein the multi-link URL is associated with a plurality of routing link URLs configured to route the user device to a plurality of corresponding application pages. The executable instructions cause the processing unit to receive user selection of the multi-link URL and rank the routing link URLs based on application installation data stored on the user device, wherein the application installation data indicates whether applications for the routing link URLs are installed on the user device. The executable instructions cause the processing unit to select a final routing link URL based on the ranking of the routing link URLs and access an application page associated with the final routing link URL.

In one example, a user device comprises memory including a multi-link application and a processing unit configured to execute the multi-link application, wherein executing the multi-link application causes the processing unit to receive a multi-link URL. The multi-link URL is associated with a plurality of routing link URLs configured to route the user device to a plurality of corresponding application pages. The multi-link application causes the processing unit to receive user selection of the multi-link URL and rank the routing link URLs based on application installation data stored on the user device, wherein the application installation data indicates whether applications for the routing link URLs are installed on the user device. The multi-link application causes the processing unit to select a final routing link URL based on the ranking of the routing link URLs and access an application page associated with the final routing link URL.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
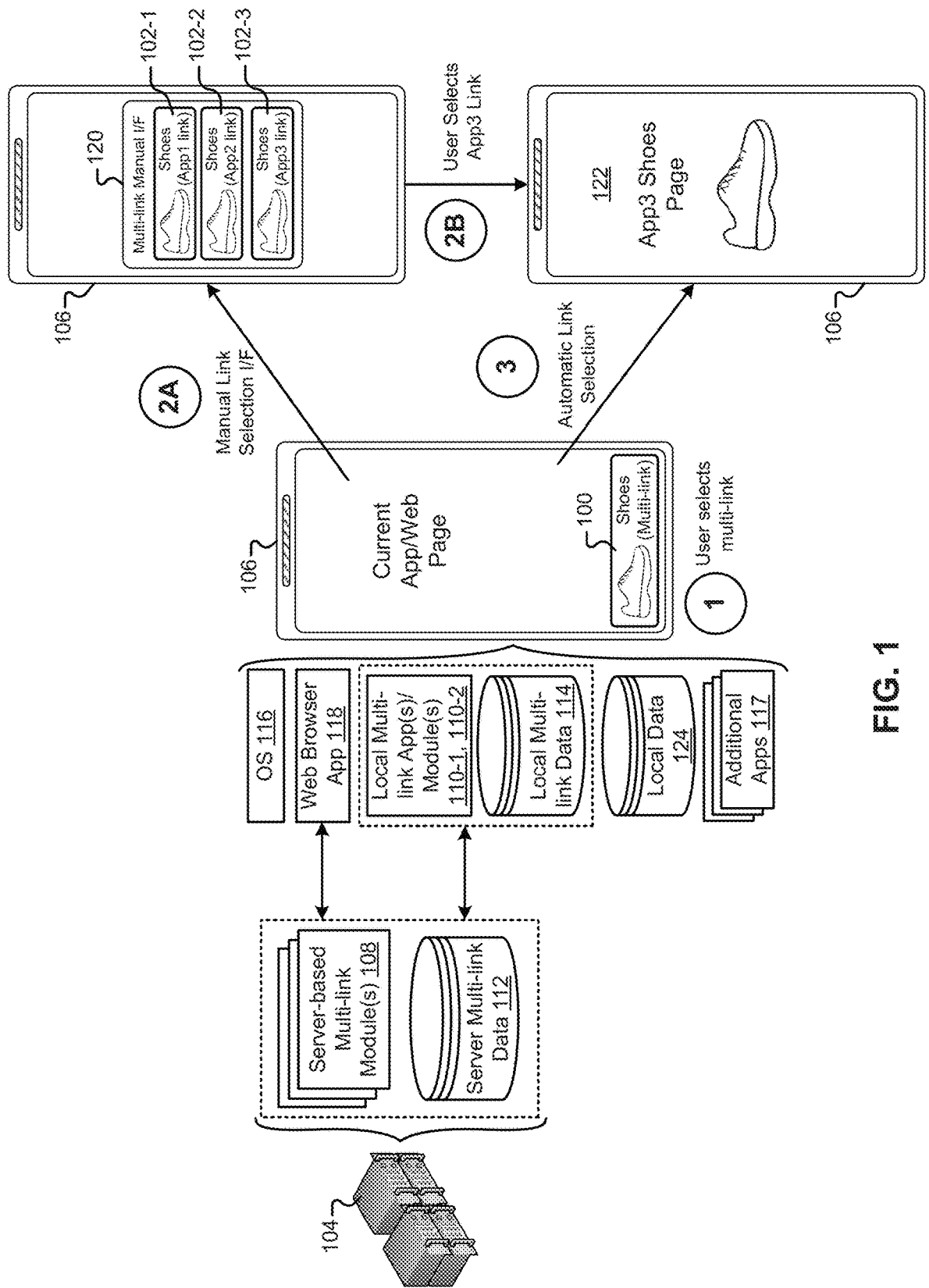
FIG. 1 illustrates an environment that includes a multi-link server and local multi-link applications/modules that provide multi-link functionality.

A link (e.g., link 100) of the present disclosure may route a user device (e.g., a smartphone) to one of multiple different application/web pages. In some implementations, user selection of the link may cause a user device to automatically access one of the multiple application/web pages associated with the link. In other implementations, user selection of the link may cause a user device to render a selection menu that allows the user to manually select from one of the possible application/web pages (e.g., see FIG. 1 and FIG. 7A).

The links described herein that may be used to automatically/manually route a user to one of a plurality of different application/web pages may be referred to as "multi-links" (e.g., multi-link 100). The individual links that may route a user device to the endpoint application/web pages may be referred to as "routing links" (e.g., routing links 102-1, 102-2, 102-3). For example, a single multi-link may be used to route a user device to an application/web page according to a manually/automatically selected routing link.

User selection of multi-links may be handled in a variety of ways. For example, user selection of multi-links may be handled by a remote server 104 and/or handled locally on a user device 106. The extent to which a remote server 104 and/or user device 106 implement the techniques of the present disclosure may vary based on the implementation. The user device 106 and remote server 104 include modules that represent functionality associated with the multi-links 100. For example, the user device 106 and the remote server 104 may include modules that generate multi-links, handle user selection of multi-links, and track multi-link performance. Modules included on a remote multi-link server may be referred to as "server-based multi-link modules 108" or "server modules 108." Modules included on a user device may be referred to as "local multi-link modules 110-1" or "local modules 110-1." In some cases, the user device 106 may include an application 110-2 that performs functionality associated with the multi-links. The application may be referred to as a "local multi-link application 110-2" or "multi-link application 110-2." In some implementations, the multi-link server 104 may be referred to as a "multi-link system 104" that includes one or more server computing devices. The multi-link server 104 and user device 106 may also store server multi-link data 112 and local multi-link data 114, respectively.

In some implementations, the selection and display of multi-links 100 and/or routing links 102 may be based on user data. For example, routing links 102 may be selected based on the installation status of applications on the user device 106 and/or application usage on the user device 106. In one example, the multi-link server 104 and/or local multi-link app/modules 110 may boost scores for routing links 102 associated with applications that are installed and/or used by the user. In another example, the multi-link server 104 and/or local multi-link app/modules 110 may remove routing links for applications that are not installed on the user device 106. In some implementations, aggregate data associated with a plurality of users (e.g., aggregate application usage) may also be used to determine when to show multi-links and routing links. In some implementations, the multi-link server 104 may provide multi-links and/or routing links based on advertisement targeting parameters.

The multi-links may provide users with relevant options for accessing entities/content (e.g., businesses, products, digital content, news stories, etc.) within applications or websites. For example, with respect to FIG. 1, the multi-link 100 may provide a user with relevant options for accessing pages directed to a product (e.g., a shoe) in one or more applications. The options may be intelligently provided for selection in a manual interface or automatically selected based on a user's personal usage patterns and/or aggregate usage. For example, the multi-links displayed to the user, or selected for the user, may include routing links for installed applications that are frequently used. In another example (not illustrated), a user may be provided with the best link(s) for playing a song or movie in a multi-media streaming application. For example, the routing links for a specific movie may provide a user with options for watching the specific movie in one or more applications, which may be chosen based on past user engagement with the applications.

Figure 2:
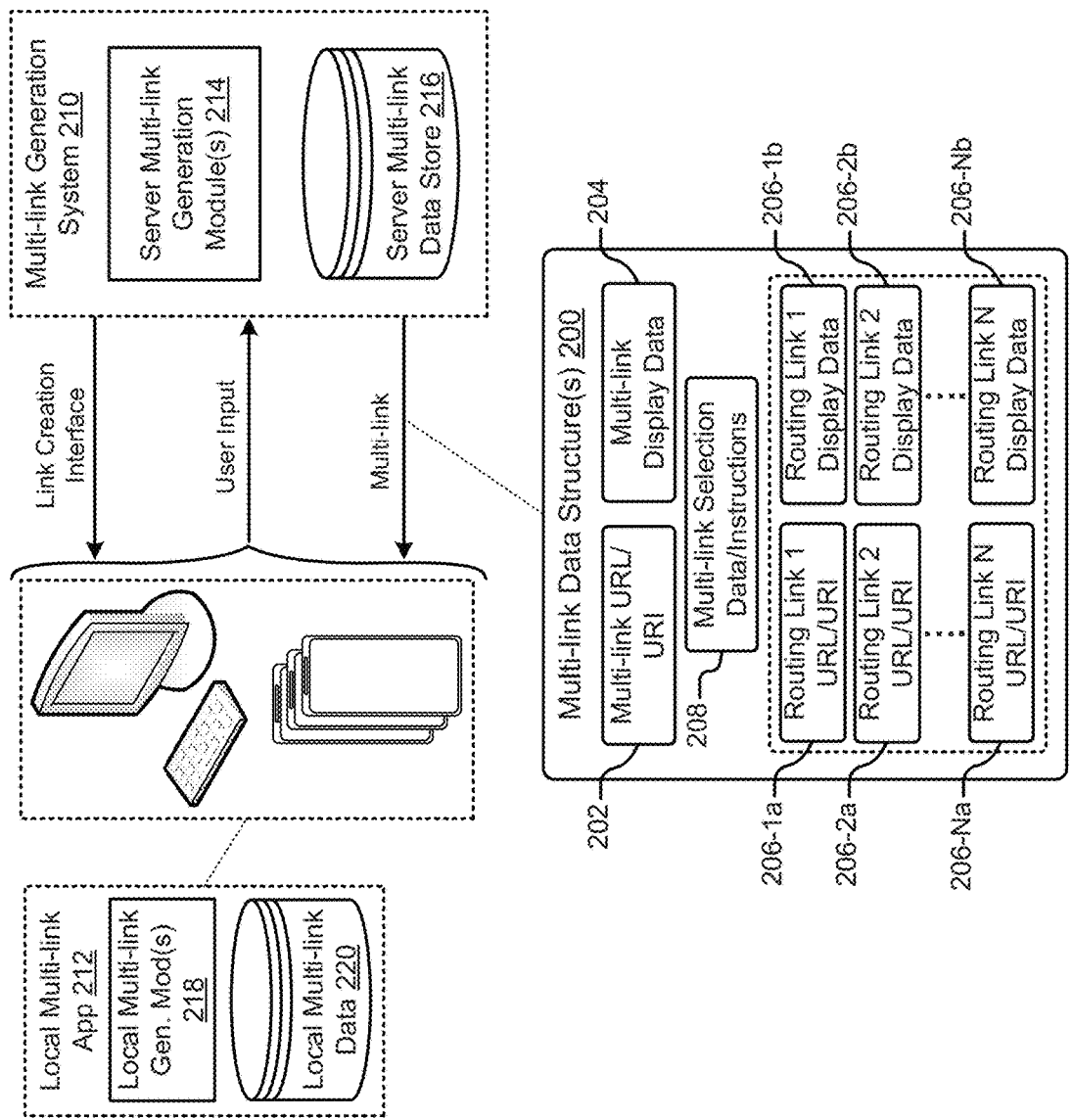
FIG. 2 illustrates multi-link creation and example data that may be used to implement a multi-link.

Multi-links may be implemented using a variety of different data structures on the multi-link server 104 and/or user device 106. Example data that may be used to implement a multi-link is illustrated in FIG. 2. The example data is illustrated as a single multi-link data structure 200 in FIG. 2. Although the example multi-link data is illustrated as a single multi-link data structure 200 in FIG. 2, the data included in the multi-link data structure 200 may be stored/generated in different parts on the multi-link server 104 and/or at the user device 106. Additionally, the data illustrated in the multi-link data structure 200 in FIG. 2 may be transmitted between the multi-link server 104 and the user device 106.

In some implementations, multi-link data 200 may include a multilink uniform resource locator (URL) 202 or multi-link uniform resource identifier (URI) 202. In some implementations, the multi-link URL/URI 202 may be a unique URL/URI that may be used to access other multi-link data on the local device 106 and/or the multi-link server 104. For example, the multi-link URL/URI 202 may be a URL/URI that accesses server multi-link data 112 stored on the multi-link server 104 (e.g., via the Internet). As another example, the multi-link URL/URI 202 may access local resources on the user device, such as a local multi-link application/module 110 configured to handle selection of a multi-link. The multi-link URL/URI 202 may be referred to as a multi-link URL 202 hereinafter.

In some implementations, a multi-link URL 202 may have a domain/path format. Although a multi-link may have an associated multi-link URL 202 with a domain and path, in some cases, a multi-link may have a different format. For example, a multi-link URL 202 may have a multi-link ID (e.g., a business or product specific ID) or other data that may be identified locally on the user device 106 and/or remotely on the multi-link server 104. In some implementations, a multi-link URL 202 may include additional parameters. For example, multi-link URLs may include parameters that identify the multi-link URL as a multi-link URL, instead of another type of URL (e.g., a typical hyperlink that routes to a single webpage). In this example, presence of the parameters in the multi-link URL 202 may trigger handling of the multi-link at the user device 106 by the OS 116, a specific installed application, and/or other local/remote modules described herein. In some examples, multi-link URLs 202 may include IDs associated with the creator of the multi-link and/or one or more affiliates associated with the multi-link. In these examples, performance of the multi-links may be tracked and associated with the creator and/or one or more affiliates.

The user device 106 may render a multi-link in a variety of interfaces. In some implementations, a user device 106 may render a multi-link on a webpage. In some implementations, a user device 106 may render a multi-link in an application, such as a launcher application, a text messaging application, an email application, or other application opened by a user. In some implementations, a multi-link may be rendered as a text-based link, such as a hyperlink (e.g., an underlined blue link). In some implementations, a multi-link may be rendered as a graphical link that includes text and/or images. For example, a multi-link may be rendered as a banner, a search result with images/description, or as another graphical link. The example multi-link 100 in FIG. 1 is a graphical multi-link that includes the image of a shoe and descriptive text. The data used to display a graphical multi-link may be referred to as "multi-link display data 204."

Each multi-link data structure 200 may include multiple routing links that are associated with the multi-link. Routing links may include URL/URIs (e.g., 206-1a, 206-2a, . . . , 206-Na) that access application/web pages. For example, the routing links may access application pages for applications 117 that are installed on the user device 106. As another example, the routing links may access web pages via a web browser application 118. In some implementations, routing links may access an application/web page for downloading and installing an application that is not currently installed on the user device 106. In these implementations, the multi-link server 104 and/or local multi-link apps/modules 110-1, 110-2 may automatically access content associated with the routing link after the application is installed. A routing link URL/URI may be referred to as a routing link URL hereinafter.

In some implementations, each of the routing links may be associated with routing link display data (e.g., 206-1*b*, 206-2*b*, ..., 206-N*b*). The routing link display data may be used to render the routing links in a graphical user interface (GUI), such a manual selection interface (e.g., see FIG. 1 and FIG. 7A). Example routing link display data may include text and/or images, such as text/images that are descriptive of the application/web page content accessed by the routing link. In implementations where the routing links are selected automatically (e.g., by the user device 106 and/or server 104), the routing links may not include associated routing link display data.

In some implementations, a multi-link data structure 200 may include multi-link selection data/instructions 208 that define how the routing links are to be ranked and/or selected. For example, selection data/instructions 208 may indicate how to automatically select a routing link in response to user selection of a multi-link. In some implementations, the selection data/instructions 208 may indicate how to select and organize routing links in a routing link selection GUI for manual user selection.

Although multi-links may be presented (e.g., rendered/displayed) as text/graphical links in a user interface (e.g., multi-link 100 of FIG. 1), multi-links may be accessible in a variety of manners. For example, a multi-link may be accessed by selecting a video with an underlying multi-link URL. As another example, multi-links may be accessed using voice commands. As another example, multi-links may be accessed by scanning codes (e.g., QR codes or barcodes) using a user device (e.g., a user device camera or other reader). In some implementations, a multi-link may be converted to an executable program. In these implementations, the executable program may be transmitted through JavaScript or other data/instruction format. In order to differentiate between a displayed link and an underlying URL/URI, a multi-link (e.g., 100) that is displayed to a user, as illustrated in FIG. 1, may be referred to as a "rendered multi-link" or a "displayed multi-link." Similarly, a routing link (e.g., 102-1, 102-2, or 102-3) that is displayed to a user, as illustrated in FIG. 1, may be referred to as a "rendered routing link" or a "displayed routing link."

FIG. 1 illustrates two example outcomes from selecting a multi-link 100. In FIG. 1, a user device 106 is accessing a current application/web page that includes a multi-link 100 for a pair of shoes. The example shoes multi-link 100 includes the text "Shoes (Multi-link)" and an image of a shoe. The text/images included in the multi-link display data of multi-link 100 may indicate specific products/content that may be accessed by selection of the multi-link 100. The text/images (e.g., Multi-link) may also indicate that the link 100 is a multi-link. For example, the multi-link display data for the shoe may indicate that selection of the multi-link 100 may lead the user to an application/web page for the shoes (e.g., for purchasing the shoes). In FIG. 1, the user may select the multi-link 100 by touching/clicking the multi-link.

FIG. 1 illustrates two different outcomes that may be provided in response to selection of the multi-link 100 at indicator (1). In a first scenario at indicator (2A), selection of the multi-link 100 may result in display of a multi-link manual interface (I/F) 120. The multi-link manual interface 120 includes a plurality of rendered routing links 102-1, 102-2, and 102-3. The three rendered routing links 102 are links to the shoes in three different applications (App1, App2, and App3). The user may select any of the three rendered routing links 102 to access the corresponding application/web pages. In FIG. 1, the user selects the Shoes App3 link 102-3 and accesses the App3 shoe page 122, as indicated at (2B). As described herein, the routing links displayed to the user, as well as the ranking of the routing links, may have been determined based on a variety of factors including, but not limited to, application installation status, historic application usage, and advertising considerations.

In another scenario in FIG. 1, selection of the shoes multi-link 100 at indicator (1) may cause the user device 106 and/or multi-link server 104 to route the user device 106 directly to one of the possible routing links associated with the multi-link 100. In FIG. 1, selecting the multi-link 100 causes automatic selection of the App3 shoes page 122 at indicator (3). As described herein, the App3 shoes link/page 122 may have been automatically selected based on a variety of factors including, but not limited to, application installation status, historic application usage, and advertising considerations. Although the routing links 102 of FIG. 1 access different applications, in some cases, routing links may route to different application pages within the same application. Although the routing links 102 of FIG. 1 are associated with the same entity (e.g., shoes), in some cases, a multi-link may use routing links that access different entities. For example, a multi-link for music may link to different genres within an application.

Figure 3:
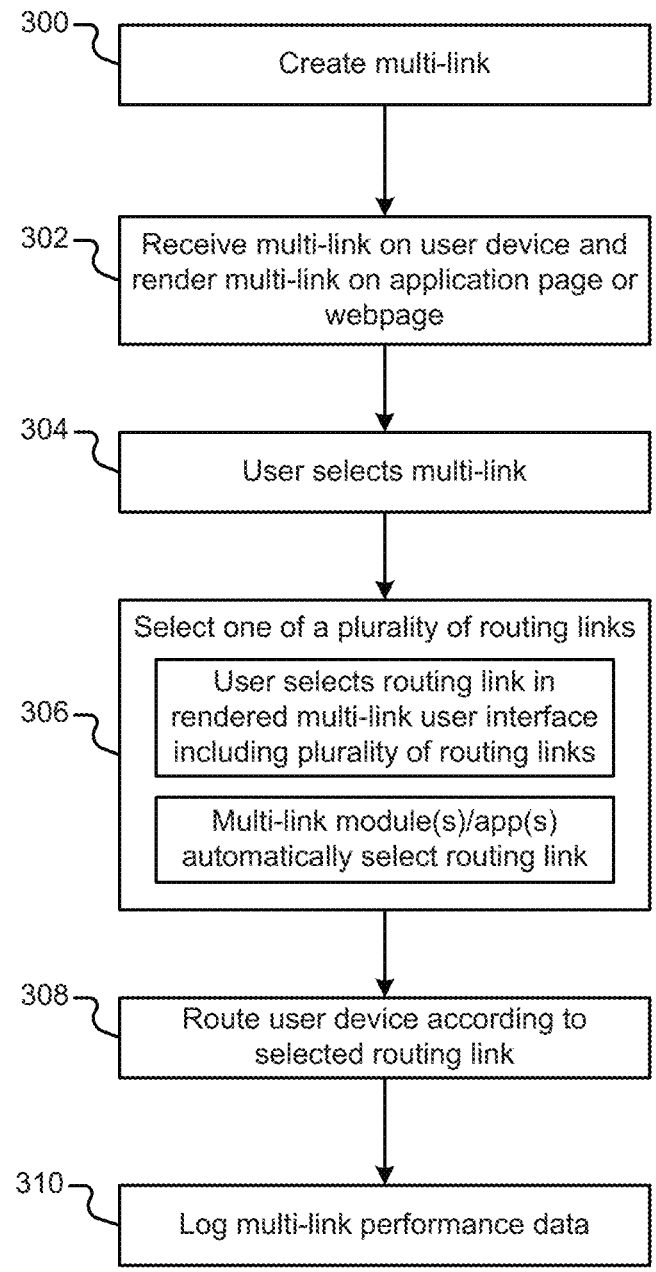
FIG. 3 illustrates an example method that describes operation of the environment of FIGS. 1-2.
Figure 4:
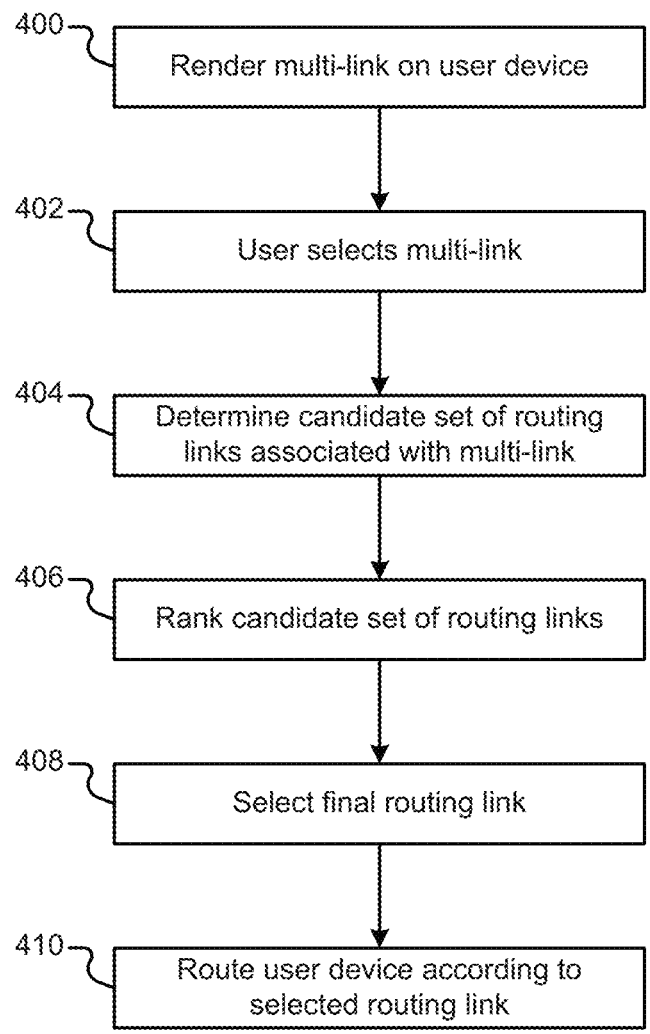
FIGS. 4-5 illustrate example methods that describe automatic routing link selection and manual routing link selection, respectively.
Figure 5:
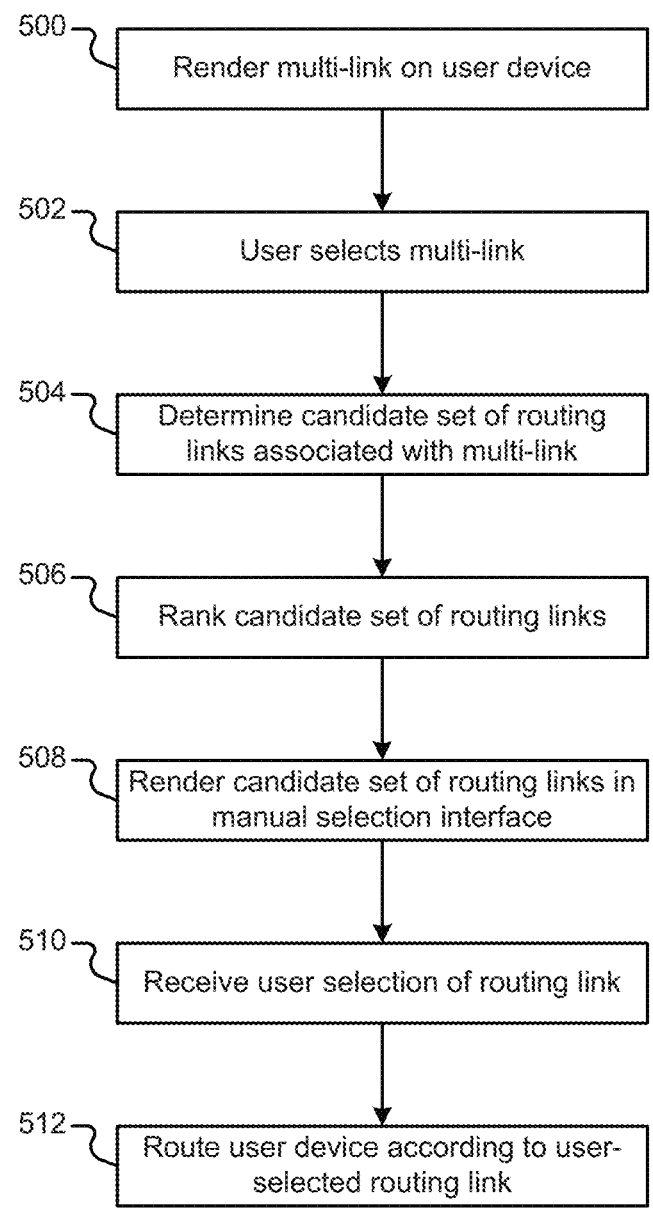
Figure 6A:
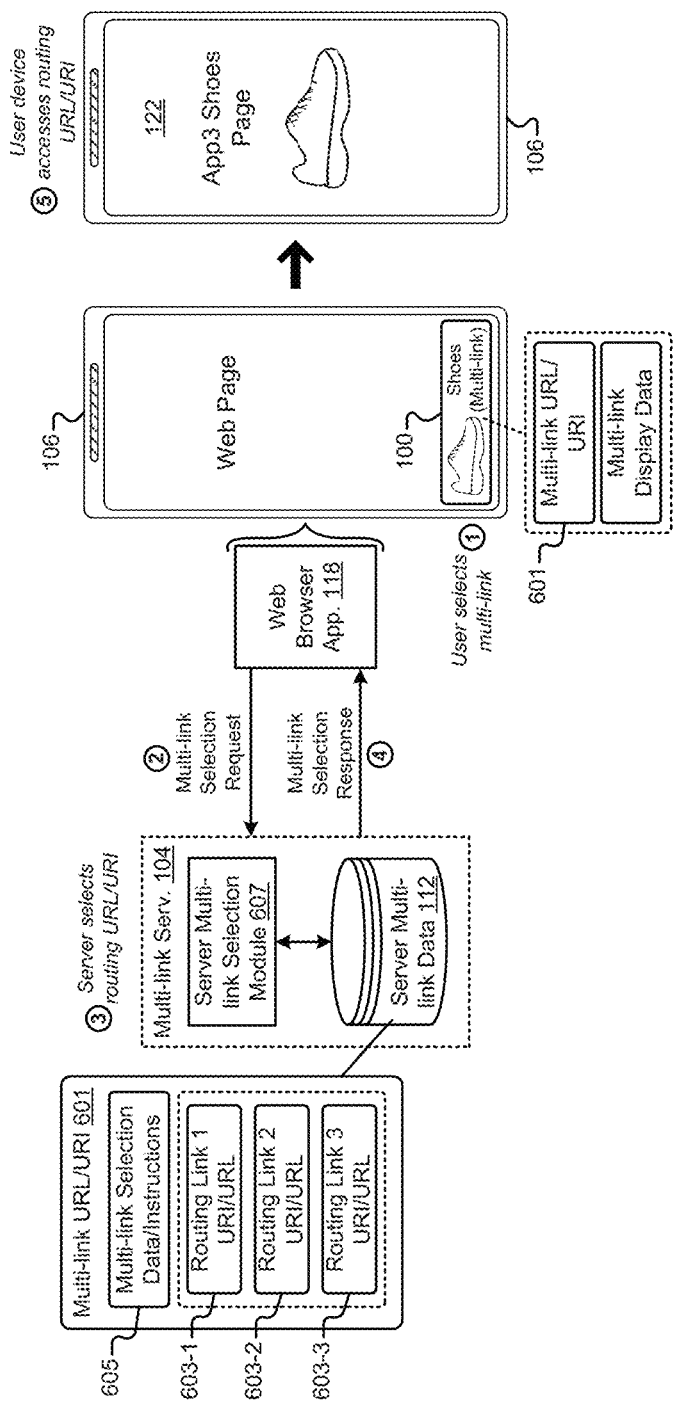
FIGS. 6A-8B illustrate example multi-link implementations that use a multi-link server and/or user device to different extents.
Figure 6B:
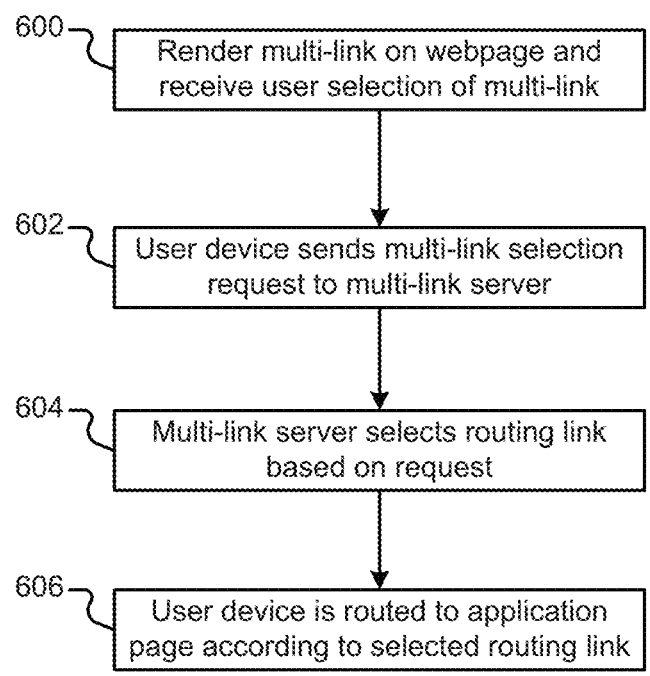
Figure 7A:
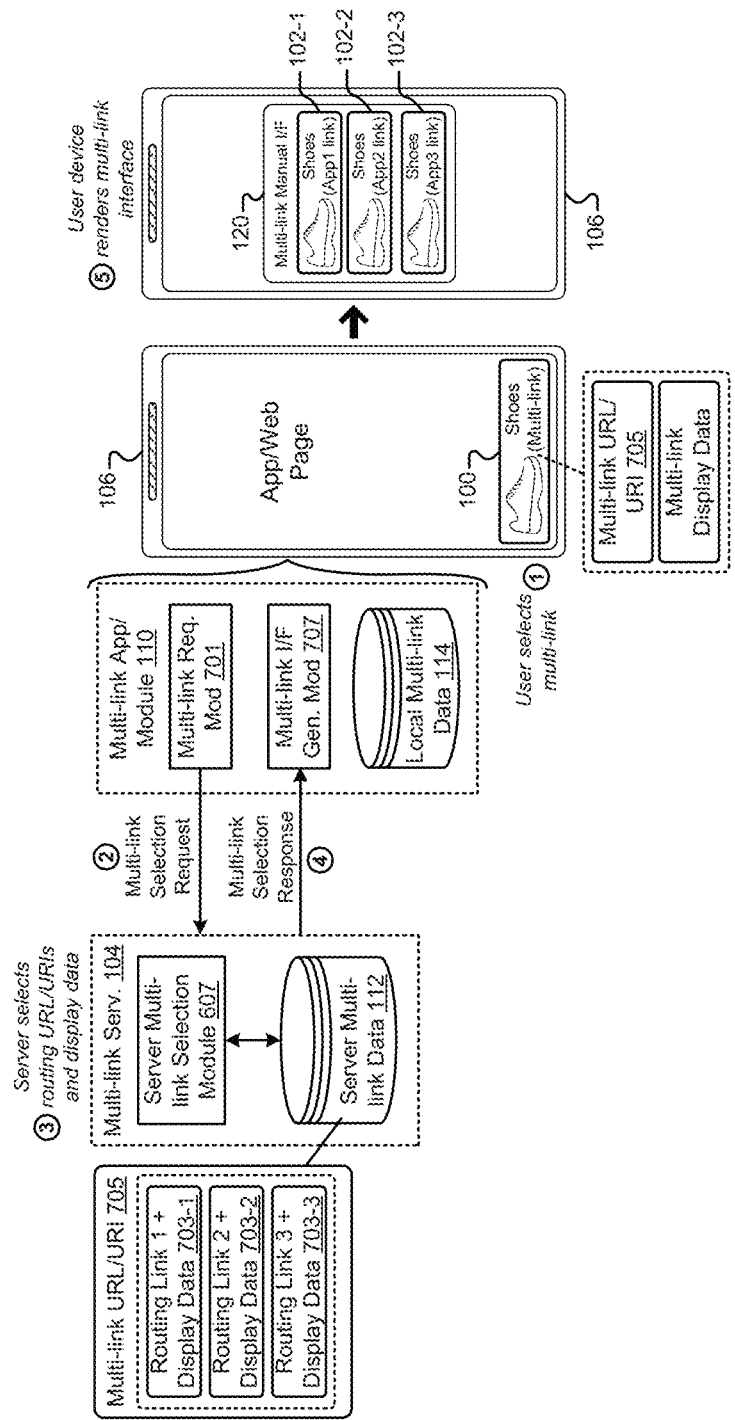
Figure 7B:
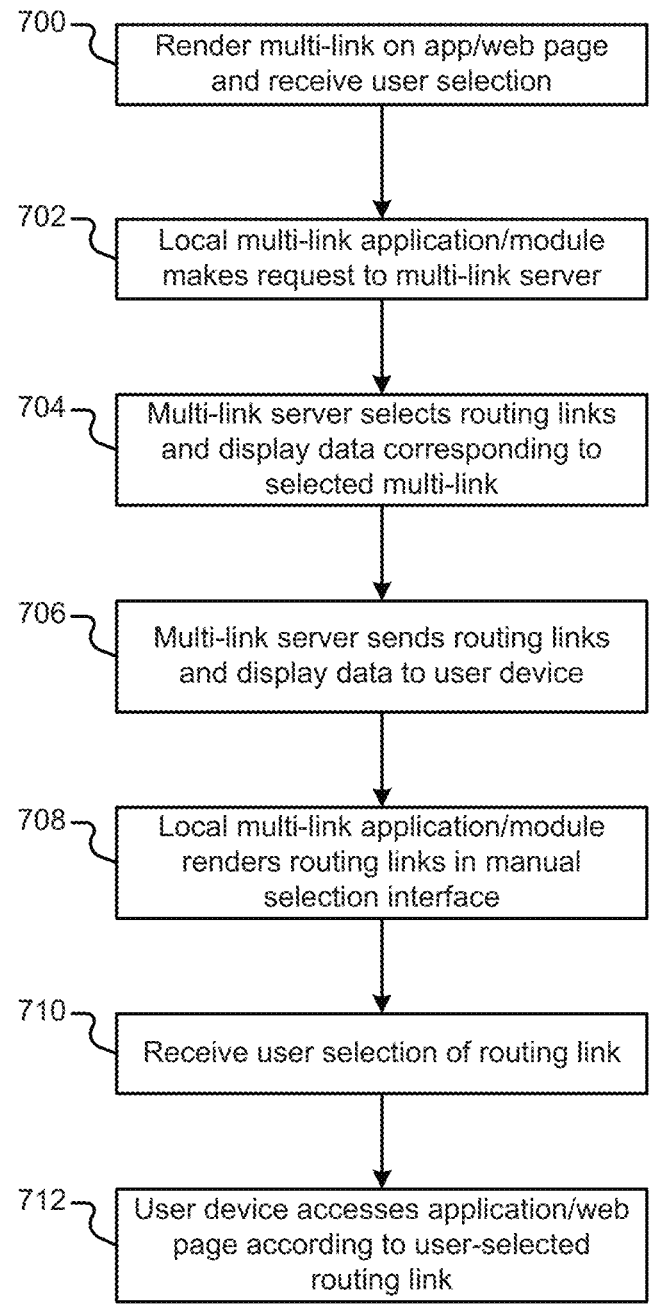
Figure 8A:
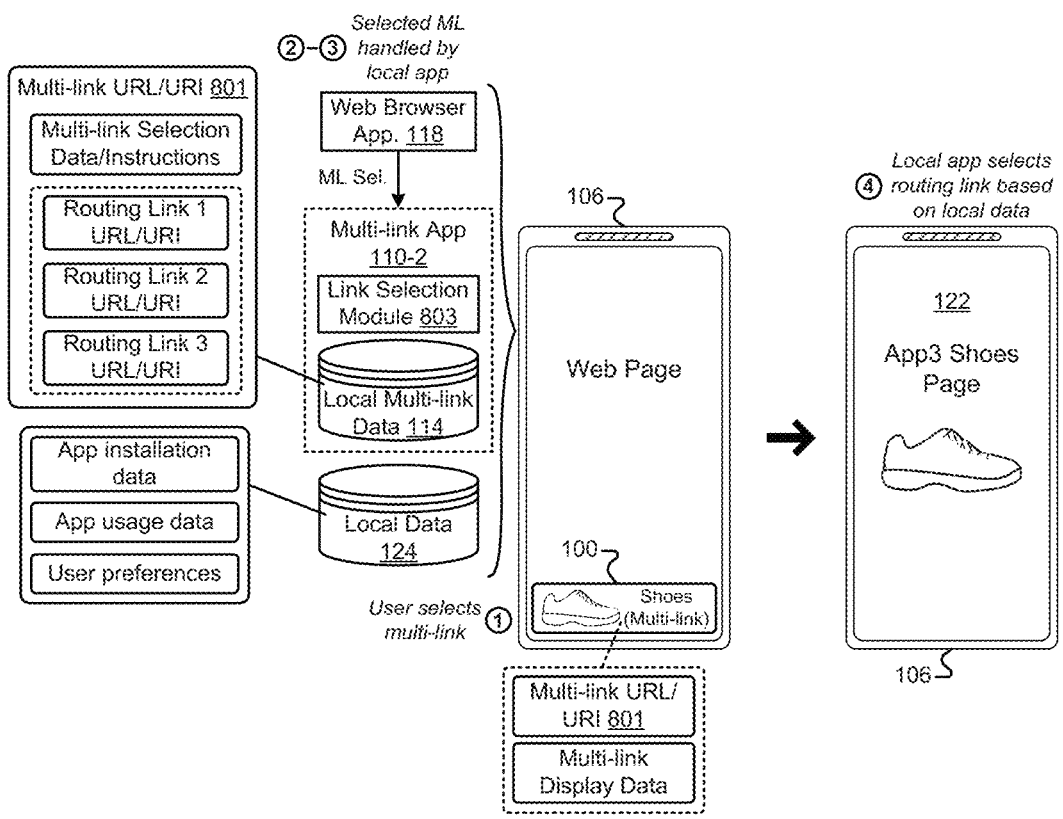
Figure 8B:
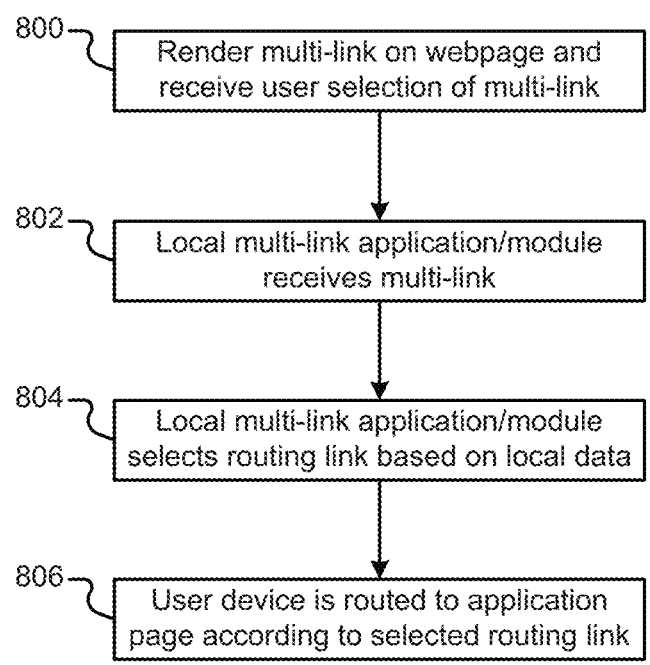
Figure 9:
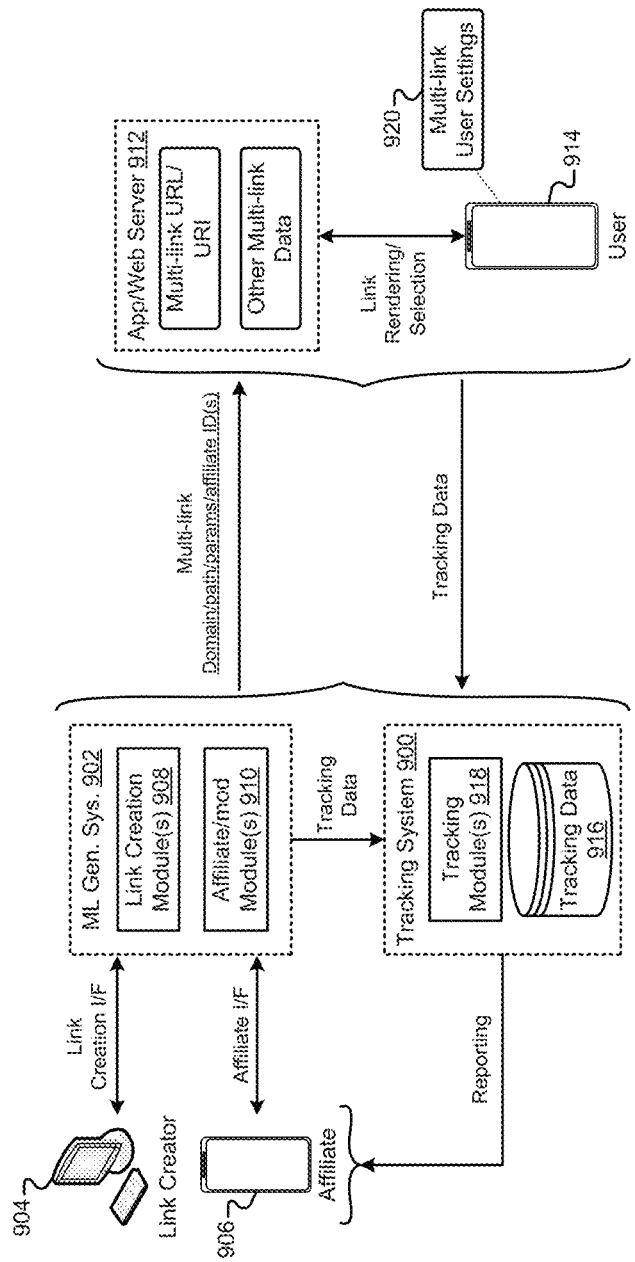
FIG. 9 illustrates creation of a multi-link, modification of a multi-link by an affiliate, and performance tracking associated with the multi-link.
Figures 10A, 10B:
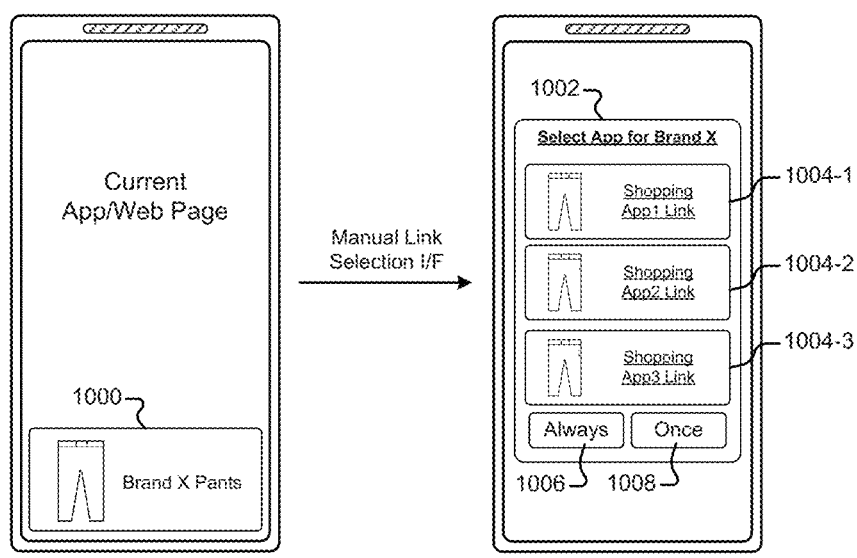
FIGS. 10A-10B illustrate example graphical user interfaces (GUIs) in which a user may select how future multi-link selections should be handled.
Figure 11:
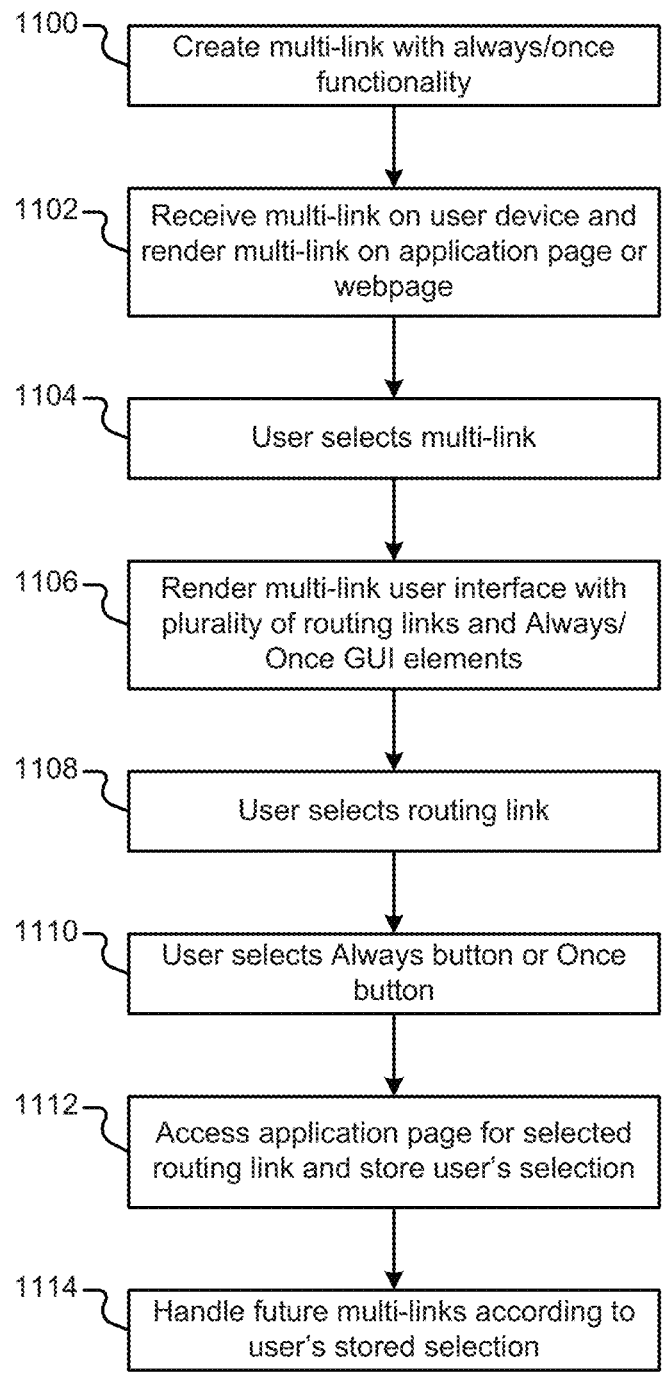
FIG. 11 illustrates an example method that describes always/once operation for multi-links.

FIG. 3 illustrates an example method that describes operation of the environment of FIGS. 1-2. FIGS. 4-5 illustrate example methods that describe automatic routing link selection and manual routing link selection, respectively. FIGS. 6A-8B illustrate example multi-link implementations that use a multi-link server and/or user device to different extents. For example, FIGS. 6A-6B illustrate an example implementation in which a multi-link selected on a webpage is handled by a multi-link server. As another example, FIGS. 7A-7B illustrate an example in which selection of a multi-link is handled by the user device and a multi-link server. As another example, FIGS. 8A-8B illustrate an example implementation in which a multi-link selected on a webpage is handled locally on the user device. FIG. 9 illustrates creation of a multi-link, modification of a multi-link by an affiliate, and performance tracking associated with the multi-link. FIGS. 10A-11 illustrate example graphical user interfaces (GUIs) and a method in which a user may select how future multi-link selections should be handled.

FIG. 3 illustrates an example method that describes example operations of the environment illustrated in FIGS. 1-2. In block 300, a multi-link creator (e.g., a human creator) may generate a multi-link using a multi-link generation system 210 (e.g., a remote server) and/or a local multi-link application 212 (e.g., see FIG. 2). In general, during multi-link generation, a creator may define multi-link data 200 (e.g., illustrated in FIG. 2) that defines multi-link behavior. The creator may generate the multi-link in a link creation interface provided by the multi-link generation system 210 and/or local multi-link application 212. The multi-link generation system 210 may include server multi-link generation modules 214 and a server multi-link data store 216 that provide link generation features described herein. The local multi-link application 212 may include local multi-link generation modules 218 and local multi-link data 220 that provide link generation features described herein. Example multi-link generation is described with respect to FIG. 9.

In block 302, the user device 106 receives a multi-link 100 (e.g., a multi-link URL and display data) and renders the multi-link 100 on an application page or a webpage. In block 304, the user selects the multi-link 100 by touching/clicking the multi-link 100. In block 306, one of a plurality of routing links associated with the multi-link are selected. In some implementations, the user device 106 may display a plurality of routing links 102 in a manual interface 120. In these implementations, the user may select the routing link in the manual interface 120. In some implementations, the user device 106 (e.g., multi-link app/modules 110-1, 110-2) and/or multi-link server 104 may automatically select a routing link.

In block 308, the user device 106 is routed according to the selected routing link. In block 310, the multi-link server 104 (e.g., tracking system) may log performance data associated with the multi-link 100, such as routing link selection and other data associated with the multi-link 100. Example performance/tracking data associated with multi-links is described with respect to FIG. 9.

FIG. 4 illustrates an example method that describes automatic routing in response to user selection of a multi-link 100. In block 400, the user device 106 renders a multi-link 100. In block 402, the user selects the multi-link 100. In blocks 404-408, the multi-link server 104 and/or the user device 106 may determine a candidate set of routing links associated with the selected multi-link, rank the candidate routing links, and select a final routing link. In block 410, the user device 106 routes to the application/web page according to the final selected routing link. The operations described in the method of FIG. 4 are only example operations for automatically routing a user device in response to selection of a multi-link. As such, additional/alternative operations may be performed in other implementations. For example, in some implementations, routing link rank may be specified in the multi-link data instead of calculated based on other factors.

FIG. 5 illustrates an example method for providing a manual selection interface 120 for a multi-link 100. In block 500, the user device 106 renders a multi-link 100. In block 502, the user selects the multi-link 100. In blocks 504-506, the multi-link server 104 and/or the user device 106 may determine a candidate set of routing links associated with the multi-link and rank the candidate set of routing links. In block 508, the user device 106 renders the candidate set of routing links in a manual selection interface (e.g., according to rank). In block 510, the user device 106 receives selection of one of the routing links. In block 512, the user device 106 is routed according to the selected routing link. The operations described in the method of FIG. 5 are only example operations for providing a manual selection interface. As such, additional/alternative operations may be performed in other implementations. For example, in some implementations, routing link rank for display in the manual selection interface may be specified in the multi-link data instead of calculated based on other factors.

The manual selection interfaces 120 illustrated in FIG. 1 and FIG. 7A are only example manual selection interfaces. As such, other manual selection interfaces may be provided by the multi-link server 104 and/or user device 106. For example, different numbers of routing links may be provided for selection. In some implementations, the number of routing links may be adjusted (e.g., according to user/aggregate data). In some implementations, the display data used to render the routing links may also vary by user. For example, different images may be provided to different users based on age/sex.

The multi-link server 104 and/or local multi-link applications/modules 110 may select candidate routing links, rank the set of routing links (e.g., for automatic selection or manual display), and automatically select a final routing link based on a variety of factors, which may be referred to herein as candidate link selection factors, link ranking factors, and final link selection factors. The candidate link selection factors, link ranking factors, and/or final link selection factors may be based on user-specific data and/or aggregate data described herein. The candidate link selection factors, link ranking factors, and/or final link selection factors may implement various selection rules, filtering rules, and/or scoring models (e.g., weighted scoring models, machine learned models, etc.).

In some implementations, the multi-link server 104, or other system, may acquire data that indicates how users engage with applications and websites. Data may be acquired from a variety of data sources including, but not limited to, user devices, websites, application programming interfaces (APIs), data providers, and other systems operated by the owner/operator of the multi-link server 104. User data may include application installation and application usage data. For example, the user data may indicate currently installed applications, when the applications were installed, when applications were used, application usage frequency, specific events performed in the applications (e.g., application opens, page views, commerce events, and custom defined events), when applications were uninstalled, and/or other application usage metrics. User data may be stored in local data 124 for a single user or stored remotely for a plurality of users.

In some implementations, user data may include historic user data that indicates how the users have interacted with previously displayed multi-links and routing links. For example, the user data may indicate a number of views for each link, whether a link was selected, and other data associated with the views/selections. The user data may include time stamps for any of the events described herein. In some cases, historic user data may also include other historic data indicating downstream events associated with selecting multi-links and routing links, such as downstream purchases and/or application installations.

In some implementations, the multi-link server 104, or other system, may generate/acquire aggregate data associated with a plurality of users. The aggregate data may include aggregation of any of the data described herein. Example aggregate data may include aggregate application installation/usage data that indicates a number of users of the application over time. For example, aggregate application usage data may include, but is not limited to, the number of daily active users (DAU) for the application and the number of monthly active users (MAU) for the application. The aggregate application usage data may also include the number of application events over time for a plurality of users. For example, aggregate application usage data may include the number of application opens over time, the number of different application states/pages accessed over time, and the number of purchases over time.

The multi-link server 104, user device 106, and/or other system(s) may implement multi-link targeting parameters that define when to show the multi-links. The multi-link targeting parameters may be based on any of the user/aggregate data described herein. For example, the multi-link server 104, user device 106, and/or other system(s) may provide multi-links based on application installation/usage status, user geo-location, and/or other parameters. In one example, a targeting parameter may indicate whether one or more applications should (or should not) be installed. In another example, a targeting parameter may be based on application usage, such as how often an application or similar applications are used, when an application was last used, and the user's past engagement with categories of applications (e.g., where applications are associated with categories). In some implementations, a targeting parameter may include whether a specific application has been deleted. In some implementations, targeting parameters may include time of day and other user device data (e.g., device type, OS, etc.).

In some implementations, the multi-link server 104, user device 106, and/or other systems may implement selection rules for multi-links and/or routing links. For example, multi-links and routing links may be selected for applications that are installed. As another example, multi-links and routing links may be selected based on application usage (e.g., select the most used applications). As another example, the multi-link server 104, user device 106, and/or other systems may select the routing links for the most popular application pages. In some implementations, a targeting parameter may include a popularity of the application page to which the routing link directs the user device. In some implementations, the multi-link server 104, user device 106, and/or other system may score the links based on device factors, such as battery level and/or network status (e.g., select links that may be locally accessed if there is no network connection). In some implementations, there may be an ordered list of applications on the user device 106 or server 104 that the user prefers to open. In these implementations, the first application in the list that is present on the user device may be opened.

In some implementations, the multi-link server 104, user device 106, and/or other system may implement a routing link scoring function that generates scores associated with the routing links. The scores may indicate relative ranks of the routing links. For example, routing links having the highest scores may be selected for display in a manual interface. As another example, a routing link with the highest score may be automatically selected. The scoring function may generate scores based on scoring features. The scoring features may be based on any of the user/aggregate data described herein, such as application installation/usage metrics. In some implementations, the scores may be generated based on one or more machine learned models (e.g., a supervised learning model) configured to receive one or more scoring features and output result scores. In some implementations, the multi-link server 104, user device 106, and/or other system may filter links based on whether an application is installed (e.g., filter out links for applications that are not installed). In some implementations, low scoring links may be filtered out (e.g., links for infrequently used apps and/or low popularity apps).

In some implementations, the multi-link server 104 (e.g., tracking system 900) and/or other systems/devices may track user/aggregate multi-link interactions and routing link interactions. For example, the servers, system(s), and/or devices may track views and selections of multi-links and routing links over time. In some implementations, targeting parameters and/or scoring features for showing multi-links and/or routing links may be based on the tracked multi-link historical interactions and/or routing link historical interactions. For example, targeting parameters may be based on a number of times the multi-links have been shown and if the user has selected (e.g., touched/clicked) the links. If a user has not selected the links in the past, the links may be less desirable for display (e.g., for an advertiser).

In some implementations, the multi-links and/or routing links may be provided as advertisements. In these implementations, advertisers may specify advertisement targeting parameters that, when satisfied, may result in the display of an advertised multi-link and/or advertised routing links. Advertisement targeting parameters may include any of the multi-link targeting parameters described herein. Additionally, or alternatively, the advertisement targeting parameters may include an advertiser bid price specified for a specific outcome associated with the advertised multi-link (e.g., a user view, a user selection, purchase, and/or other downstream user action). In some implementations, an advertisement targeting parameter may include an expected revenue for the multi-link, which may equal a probability of the specific outcome multiplied by the bid for the outcome (e.g., revenue for a purchase multiplied by the probability of a purchase).

The candidate link selection factors, link ranking factors, final link selection factors, and targeting parameters (e.g., advertisement targeting parameters) may be set by the owner/operator of the multi-link server 104, link creators, affiliates, advertisers, and/or other parties (e.g., users). As such, operation of the multi-links may be controlled by one or more different parties, depending on the implementation.

The timing of the example operations described with respect to automatically selecting routing links may vary, depending on the implementation. For example, in some implementations, a final routing link may be automatically selected in response to user selection of the multi-link. In other implementations, the final routing link may be selected prior to rendering the multi-link. In other implementations, the final routing link may be selected after rendering the multi-link, but before user selection of the multi-link. The timing of the example operations described with respect to ranking and displaying the routing links in a manual selection interface may also vary, depending on the implementation. For example, in some implementations, the ranking of the routing links may be determined prior to rendering the multi-link. As another example, the ranking of the routing links may be determined after rendering the multi-link, but prior to user selection of the multi-link. As another example, the ranking of the routing links may be determined after user selection of the multi-link. The routing link display data may be acquired at the user device at any time prior to rendering the routing links.

In some implementations, multi-links may be preconfigured to provide automatic routing link selection or a manual selection interface. In other implementations, a multi-link server 104, user device 106, and/or other system may be configured to automatically select a routing link or provide a manual selection interface based on auto-manual selection factors. In some implementations, auto-manual selection factors may include the number of possible routing links. For example, in cases with greater than a threshold number of routing links, the multi-link server 104 may provide a manual interface. As another example, a routing link may be automatically selected if it is the only routing link for the multi-link (e.g., the only routing link for an installed application). In some implementations, auto-manual selection factors may be based on routing link scores. For example, a routing link may be automatically selected if it is associated with greater than a threshold routing link score. As another example, a routing link may be automatically selected if it is associated with a routing link score that is sufficiently greater than other available routing links. In another example, a routing link may be automatically selected if it is associated with a routing link score that is a threshold amount greater than the next highest routing link.

FIG. 6A illustrates an example scenario in which a multi-link 100 automatically routes a user device 106 to an application page 122. In FIG. 6A, the user selects a multi-link 100 on a webpage. The multi-link server 104 automatically selects a routing link in response to selection of the multi-link 100. The user device 106 is then routed to the application page 122 according to the routing link. Note that the example system of FIG. 6A may not require that the user device 106 includes components (e.g., applications/modules 110) for handling multi-link selection, as multi-link selection is handled by the multi-link server 104.

FIG. 6B illustrates an example method that describes operation of the environment illustrated in FIG. 6A where an example multi-link server 104 may automatically route a user device 106 according to a selected multi-link. In block 600, the web browser 118 renders the multi-link 100 on a webpage and the user selects the multi-link 100.

In block 602, the user device 106 sends a multi-link selection request to the multi-link server 104. The multi-link selection request may include a multi-link URL (e.g., the multi-link server URL) that identifies the selected multi-link 100. In some implementations, additional data may be included in the multi-link selection request, such as user geolocation, user agent data, and other data.

In block 604, the multi-link server 104 automatically selects a routing link based on the received request. In FIG. 6A, the multi-link URL 601 is associated with three routing link URLs 603-1, 603-2, 603-3 (e.g., one of which is for the App 3 shoe page 122) and multi-link selection data/instructions 605 at the multi-link server 104. In FIG. 6A, the multi-link server 104 may select a final routing link according to any of the techniques described herein. For example, the multi-link server 104 may select a candidate set of routing links, rank the routing links, and then select the final routing link. In some implementations, the multi-link server 104 may rank/select the routing links based on data stored at the server. Additionally, or alternatively, the multi-link server 104 may rank/select the routing links based on data received in the multi-link selection request. The multi-link server 104 includes a server multi-link selection module 607 that may select the routing link based on the received request. In block 606, the user device is routed to the application page (e.g., the App 3 shoe page 122) according to the selected routing link (e.g., routing link URL). For example, the multi-link server 104 may send the routing link URL for the App 3 shoe page in a multi-link selection response. In this example, the user device 106 (e.g., App 3) may use the routing link URL to access the App 3 shoe page 122.

FIG. 7A illustrates an example scenario in which a user device 106 provides a multi-link selection interface 120. In FIG. 7A, the user selects a multi-link 100 in an application or on a webpage. The multi-link server 104 provides a multi-link selection response that includes multi-link data. The local multi-link application/module 110 renders the multi-link manual user interface 120 according to the received multi-link data.

The local multi-link functionality on the user device 106 may be implemented in a variety of ways. In some implementations, the local multi-link functionality may be included in an application executed on the user device 106. For example, the local multi-link functionality may be implemented as a user-selectable application that is configured to handle multi-link functionality, a launcher application including multi-link functionality, and/or as a background application/service. In some implementations, the local multi-link functionality may be implemented as a module of another application (e.g., an application software development kit (SDK) and/or web SDK). In some implementations, the user device operating system 116 may be configured to provide multi-link functionality on the user device 106. In some implementations, multi-link functionality may be provided by one or more APIs. The example multi-link functionality may be included by developers into the operating system and/or applications prior to, or after, a user acquires the user device 106. Example multi-link functionality performed by applications, modules, and or the operating system may include, but is not limited to: 1) rendering a multi-link, 2) recognizing user selection of a multi-link (e.g., based on a multi-link URL registered for an application or an application-specific multi-link), 3) ranking/selection of a routing link, and/or 4) rendering of a manual selection interface.

As described herein, multi-link URLs may include parameters that identify the multi-link URLs to the user device 106, such as the OS 116, a launcher application, or other application on the user device 106. In FIG. 7A, the local multi-link application/module 110 may identify an additional parameter in the multi-link URL that causes the local multi-link application/module 110 to handle selection of the multi-link. In some cases, an OS developer (e.g., Apple Inc., Google LLC, etc.) may define the domain, path, and/or parameters that are recognized by the OS 116. In other cases, an application developer may define the domain, path, and/or parameters that are recognized by the applications/modules 110. In some cases, the multi-link URL parameter may be added to the end of the multi-link URL (e.g., by the link creator or other party). An example parameter (e.g., a flag) may include www.domain/path/ . . . multilink=1, where '1' indicates that the link is a multi-link.

FIG. 7B illustrates an example method that describes operation of the local multi-link application/module 110 and the multi-link server 104 in response to selection of the multi-link 100 in FIG. 7A. In block 700, the user device 106 renders the multi-link 100 and the user selects the multi-link 100. In block 702, the local multi-link application/module 110 (e.g., a multi-link request module 701) sends a multi-link selection request to the multi-link server 104. In some implementations, the local multi-link application/module 110 may include additional data in the request, such as user location, user agent data, and/or other local data from the user device 106. In some cases, the local multi-link application/module 110 may acquire additional/alternative data on the user device 106 that may not be acquired by the web browser 118, such as application-specific data.

In block 704, the multi-link server 104 selects routing links and routing display data 703-1, 703-2, 703-3 corresponding to the selected multi-link URL 705. In FIG. 7A, the multi-link server 104 (e.g., server multi-link selection module 607) selects three routing links 703 and corresponding display data. In some implementations, the multi-link server 104 may select candidate routing links and rank the routing links for display at the user device. In block 706, the multi-link server 104 sends a multi-link response to the user device 106 including the routing links and display data.

In block 708, the local multi-link application/module 110 (e.g., a multi-link interface generation module 707) renders the routing links 102 in a manual selection interface 120. In some implementations, the routing links 102 may be arranged by rank (e.g., a highest-ranking routing link at the top of the list). Although the routing links 102 are rendered in the manual interface 120 by a local multi-link application/ module 110 in FIG. 7A, a manual interface may be generated on a webpage by a web browser (e.g., using data received from the multi-link server 104). In block 710, the local multi-link application/module 110 receives user selection of a routing link. In block 712, the user device 106 accesses an application/web page according to the selected routing link.

FIGS. 8A-8B illustrate an example scenario in which a multi-link automatically routes a user device to an application page. In FIG. 8A, the user selects a multi-link 100 on a webpage and a multi-link application 110-2 automatically selects a routing link locally (e.g., without using a multi-link server 104). In block 800, the web browser 118 renders the multi-link 100 on a webpage and the user selects the multi-link 100. In FIG. 8A, the local multi-link application 110-2 handles selection of the multi-link 100 on the user device 106. In block 802, the local multi-link application 110-2 receives the multi-link (e.g., multi-link URL 801). In block 804, the local multi-link application 110-2 (e.g., a link selection module 803) automatically selects a routing link based on local data 124 (e.g., app installation/usage data, user preferences, etc.) included on the user device 106. In block 806, the user device 106 is routed to the application page 122 associated with the selected routing link. Although the multi-link 100 in FIG. 8A is rendered in a webpage and handled locally, in other implementations, the multi-link may be rendered locally by an application and also handled by an application locally using on-device local data.

FIG. 9 illustrates example multi-link creation and tracking. Creators, affiliates, advertisers, or other parties may configure the content and behavior of the multi-links when generating the links. For example, the creators, affiliates, advertisers, or other parties may define the routing links and define parameters for showing multi-links (e.g., manual/automatic parameters), ranking the routing links, selecting final routing links, etc. In some implementations, users may define the behavior of multi-links on the user device. Example link creation, modification, and tracking are described hereinafter with respect to FIG. 9.

The multi-link server 104 may include a multi-link generation system 902 that provides a user interface for generating multi-links. In some implementations, owners/operators of the multi-link server 104 may provide a multi-link generation application that provides a user interface for generating multi-links. The server/application-based multi-link generation interface may provide GUI elements for entering multi-link data, selecting multi-link data, and previewing multi-link behavior.

Multi-links may be created and modified by a variety of parties. In some cases described herein, a "link creator" may refer to the party that originally creates a multi-link (e.g., the multi-link data structure 200). A created multi-link may be modified by one or more parties after initial creation. The additional parties that modify an existing multi-link may be referred to as "link modifying parties" or "link modifiers." A multi-link may be modified by one or more link modifiers. Example link modifiers may include affiliate parties ("affiliates"). An affiliate may refer to any party that provides a multi-link on a website, in an application, on a platform (e.g., a social media platform), or in another location. Although different parties may modify the multi-links, link modifiers may be referred to generally hereinafter as affiliates. Example link creator and affiliate computing devices 904, 906 are illustrated in FIG. 9 in communication with the multi-link generation system 902.

Any of the data included in the multi-link data structure 200 may be modified after creation. In some examples, affiliates may add affiliate IDs to the multi-link URL and/or routing URLs that identify the affiliate associated with the multi-link. In these examples, performance of the multi-link (e.g., user views, selections, purchases, etc.) can be attributed back to the affiliate that placed the link (e.g., on a website, application, etc.). Multi-links may be modified by a sequence of parties after creation. In these cases, there may be data (e.g., IDs) in the multi-link attributed to the creator and each of the link modifiers in the chain of link modifiers.

FIG. 9 illustrates a link creator device 904 that creates a link using link generation functionality (e.g., link creation modules 908) provided by the multi-link generation system 902 (e.g., a component of the multi-link server 104). FIG. 9 also includes an affiliate device 906 that modifies the created multi-links using link modification functionality (e.g., affiliate/modification modules 910) provided by the multi-link generation system 902. In FIG. 9, the multi-links are provided to a server (e.g., app/web server 912), such as a server that may provide the multi-links in websites and/or applications. In FIG. 9, a user device 914 may render a multi-link, which may be handled by the user device 914, the multi-link server 104, and/or another server.

The tracking system 900 of FIG. 9 may acquire tracking data for the multi-links that indicate how the multi-links are performing. The tracking system 900 includes modules (e.g., tracking modules 918) that provide the tracking functionality, such as tracking data acquisition and data processing. The tracking system 900 includes a tracking data store 916 that stores the raw and processed tracking data. The tracking system 900 may acquire data from a variety of sources, such as the user device 914, the multi-link server 104, and/or other systems (e.g., a web server, advertisement system, or other systems).

Multi-link creators and modifiers can create and modify links using a variety of interfaces described herein. In some implementations, multi-link modifiers may modify the created multi-links in a similar manner as the creators that created the multi-links. For example, the link modifiers and the link creators may use a similar interface provided by the multi-link generation system 902. In other implementations, link modifiers may use different interfaces to modify the created multi-links.

In some implementations, creators may create a multi-link by manually providing multi-link data into a link creation interface. For example, creators may manually specify/provide multi-link URLs, multi-link display data, routing URLs, routing display data, and other multi-link data. In some implementations, creators may select multi-link data that was provided by another party to the multi-link generation system 902. For example, creators may select multi-link data that was provided by an advertiser or a brand manager.

In some implementations, the multi-link generation system 902 may automatically generate multi-link data that the creator may select in the link creation interface. For example, the multi-link server 104 may generate multi-link display data, routing link URLs, and routing link display data based on data acquired from websites and/or application pages. In some implementations, the multi-link generation system 902 may provide example multi-links and routing links based on data entered by a creator, such as preferred applications and/or products. In some implementations, the multi-link generation system 902 may automatically acquire multi-link data for applications, products, brands, or other parties that the creator has specified in the multi-link generation interface (e.g., the creator specifies trusted parties). In one example, a brand may indicate to the multi-link generation system 902 that the brand trusts a specific online retailer site. In this example, the multi-link generation system 902 may acquire data for all of the brand's products available on the online retailer site. The multi-link generation system 902 may then provide example routing links to the brand for generation of multi-links.

In some implementations, the creator/modifier may specify whitelists and blacklists for the multi-links. Example whitelists/blacklists may indicate one or more of the following: 1) applications that should be used or not used in routing links, 2) applications/websites that may include the multi-links, 3) regions and associated languages that may display the multi-links, and/or 4) affiliates (e.g., brands, stores, individual sellers, specific individuals, etc.) that may display the multi-links and/or be routed to by the multi-links. The whitelists/blacklists may be implemented by the multi-link server 104, user device 106, 914, and/or other system.

In some implementations, a creator/modifier may define whether a multi-link will display a manual interface or automatically route to a routing link. In some implementations, a creator may define parameters that determine whether a link will provide a manual/automatic experience. For example, a creator may indicate that a specific routing link be chosen automatically if it is the only routing link for an application that is installed on the user device. In some implementations, a creator/modifier may indicate that an application should be installed for showing links. For example, the creator may make a list of applications that are recommended for higher ranking in a manual interface and/or for automatic selection. In some implementations, a creator/modifier may specify any of the targeting parameters for showing the multi-links, routing links, etc. For example, the creator/modifier may specify parameters for showing multi-links and ranking/scoring routing links.

In some implementations, a user may set user settings 920 for handling multi-links on the user device 914. For example, the user may control whether multi-links are handled manually or automatically. The user may set the user settings in a variety of ways, depending on the implementation. In some implementations, the user device 914 may include a user settings menu that allows the user to change settings for multi-link rendering and handling. For example, if multi-links are handled at an operating system level or a launcher level, a user settings menu may be provided by the launcher application. If one or more specific applications are installed on the user device that handle selection of the multi-links, the one or more specific applications may include user settings that may allow the user to control the rendering and handling of the multi-links. In some implementations, a user may also use a local application/module to create, modify, and track multi-links.

After creators/affiliates create and modify the multi-links, the multi-links may be distributed via a variety of channels. For example, advertisers may use the multi-links in advertisements. As another example, affiliates may post and share the links via their associated channels (e.g., websites and applications).

The tracking system 900 may track multi-link level usage and routing link level usage. For example, the tracking system 900 may track specific multi-link views/selections and routing link views/selections. The tracking system 900 may track multi-link and routing link performance on a per-user level and/or an aggregate level. Data may be reported to the tracking system 900 from a variety of sources, such as user devices (e.g., user device SDKs) that display/handle multi-links, servers that provide multi-links, and/or servers that handle multi-link selection.

In some implementations, the tracking system 900 may track the creator ID, affiliate ID, or other IDs associated with the multi-link events and/or routing link events (e.g., views, selections, etc.). For example, the IDs may be reported for link views and/or link selections. In some implementations, the tracking system 900 may track the users that viewed/selected the multi-link. In some implementations, the tracking system 900 may track which multi-links and routing links were viewed, where they were viewed (e.g., webpage, app state, etc.), when they were viewed, and/or how long the links were viewed. In some implementations, the tracking system 900 may track which multi-links and routing links were selected by users, where they were selected, and when they were selected.

In some implementations, the tracking system 900 may track routing link group tracking data, such as the routing links considered in the manual/automatic scenarios, the ranks of the routing links, scores for the routing links, etc. Using routing link group tracking data, different parties may determine how their links performed relative to other links. For example, a first online retailer may determine how their links performed relative to another online retailer. In some implementations, the tracking system 900 may track downstream events after selection of the links, such as purchases, application installs, and/or which applications were ultimately used to open the routing links.

In some implementations, the multi-link server 104 may report tracking data to various parties. For example, the multi-link server 104 may report tracking data to creators, one or more affiliates, brands, vendors, and/or other parties. In some implementations, the multi-link server 104 may provide a dashboard interface that provides the tracking data to the parties. The parties may query and organize the data according to various parameters. For example, the parties may view data on a per multi-link basis, per affiliate basis, etc. In some implementations, the tracking data may be used for attribution purposes, such as credit to one or more parties in the multi-link creation, modification, and distribution pipeline. In some implementations, attribution to a link creator, modifier (e.g., affiliate), and/or distributor may result in financial compensation based on performance of the links (e.g., payment for purchases, installs, views, selections, etc.).

In some implementations, a manual link selection interface may include additional GUI elements that allow a user to select how future multi-link selections should be handled. For example, a manual link selection interface may include a GUI element (e.g., button) for selecting whether future multi-links are to be automatically handled by the selected application (e.g., always handled by the selected application). In this example, the manual link selection interface may also include a GUI element (e.g., a button) for indicating that the current selection is a one-time only selection of an application.

FIGS. 10A-10B illustrate example GUIs in which a user may select how future multi-link selections should be handled. In FIG. 10A, a multi-link 1000 for a pair of pants from Brand X is illustrated. Selection of the multi-link 1000 launches a manual multi-link selection interface 1002 illustrated in FIG. 10B. The manual multi-link interface 1002 of FIG. 10B includes three routing links 1004-1, 1004-2, 1004-3 for the Brand X pants. Specifically, routing links for three different shopping apps (e.g., shopping apps 1-3) including the Brand X pants are illustrated.

The manual interface 1002 of FIG. 10B includes buttons 1006, 1008 for selecting how future multi-link selections should be handled. For example, the GUI includes an "Always" button 1006 and a "Once" button 1008. The manual interface 1002 of FIG. 10B also includes text indicating the outcome of selecting the Always button 1006 or the Once button 1008. For example, the text instructs the user to "Select App for Brand X," which may indicate to the user that they may always use a specific app for Brand X items or use the specific app just once for Brand X items.

The user may select any of the routing links 1004 in FIG. 10B. The user may further select the Always button 1006 or the Once button 1008. For example, the user may select the Always button 1006 to indicate that, in the future, they want to automatically open multi-links for Brand X items using their currently selected routing link app. As another example, a user may select the Once button 1008 to indicate that they would like to use the selected routing link app to open Brand X multi-links only for this specific multi-link. Selecting the Always button 1006 may cause future multi-links for Brand X to automatically be routed to a routing link for the selected app. Selecting the Once button 1008 may cause the user device to show multi-link manual interfaces for future Brand X multi-links, instead of causing automatic selection for Brand X multi-links.

A multi-link that provides for always or once selection, as in FIG. 10B, may be associated with additional multi-link display data (e.g., text/images) for rendering the manual multi-link selection interface. A multi-link that provides for always or once selection, as in FIG. 10B, may also include additional multi-link data that may be used for handling future selection of multi-links according to the user's indicated preference (e.g., always or once). The additional data for rendering the multi-links and handling user-selection of the multi-links including always/once functionality may be referred to herein as "multi-link handling data" or "handling data." The handling data for rendering the manual selection interface (e.g., text in FIG. 10B) may be included in the multi-link display data described herein, which may be included in a variety of locations (e.g., in the multi-link URL/URI, at a server, etc.). The handing data for handling future selection of multi-links (e.g., brand name/ID) may also be included in a variety of locations, such as the multi-link URL/URI itself, in multi-link metadata, and/or at a server, depending on the implementation. Example handling data for handling future selection of multi-links may include a variety of types of data described herein, such as a link creator name/ID, a brand name/ID, and/or other names/IDs. The user device and/or a server can store the selected handling data to determine how to automatically handle future multi-link selection on the user device.

The multi-link creation interface may be configured to provide a link creator with the ability to specify whether a multi-link will provide the always/once functionality described herein. If the link creator specifies that a multi-link will provide the always/once functionality, the link creator may also specify the handling data, such as text and/or images to be included in the multi-link selection interface. The link creator may also specify the handling data used for handling future automatic selection of multi-links. The multi-link creation interface may also provide a preview of the generated multi-link to the link creator. The link creator may manage their multi-link text and handling data over time to provide the desired functionality to users that select their multi-links.

Link creators may include a variety of parties described herein, such as advertisers, brand managers, content providers, artists, influencers, or other parties. In one example, a link creator may include a brand (e.g., a brand employee) that wants a user to buy their branded products using the user's desired app (e.g., as illustrated in FIGS. 10A-10B). In another example, a link creator may include a content provider that provides one or more types of content, such as music, videos, movies, news articles, etc. As another example, a link creator may include a musical artist that may want a user to listen to the artist's music using the user's desired app. An example manual interface for a musical artist may include text that instructs the user to "Play Artist X's Music Using." The manual selection interface may also include links to multiple music applications for playing the artist's music along with an Always button and a Once button.

Example handling data may include names and/or IDs that may be used by the link creator to indicate how the multi-links should be handled. The handling names/IDs may indicate a variety of types of information including, but not limited to, a link creator (e.g., a link creator ID), a brand (e.g., brand name/ID), a category/subcategory, other type of name/ID, and/or a combination of names/IDs. In some cases, the handling data may be specific to the link creator. In some cases, there may be a global schema of handling data, such as a schema for brands, categories/subcategories, etc. In some implementations, the handling data (e.g., names/IDs) may be included in the multi-link URL/URI. In some implementations, the handling data (e.g., names/IDs) may be stored at a server that handles multi-link selection.

FIG. 11 illustrates an example method that describes always/once operation for multi-links. The method of FIG. 11 is described with respect to the multi-link 1000 for Brand X pants in FIGS. 10A-10B. In block 1100, the link creator creates the multi-link 1000 with the always/once functionality. For example, the link creator may specify the handling text "Select App for Brand X." The link creator may also specify the handling data to indicate how the multi-links should be handled in the future. For example, the link creator may generate a multi-link URL/URI including an ID for Brand X. As another example, the link creator may specify handling data, such as the ID for Brand X, at a server that will handle future selections of multi-links.

In block 1102, after multi-link generation, the generated multi-link (e.g., the Brand X pants multi-link 1000 of FIG. 10A) is delivered and rendered on a user device (e.g., on a web/app page). In block 1104, the user selects (e.g., touches/clicks) the multi-link. In block 1106, the user device renders the multi-link user interface with a plurality of routing links and Always/Once GUI elements (e.g., see FIG. 10B). In block 1108, the user selects one of the routing links. In block 1110, the user selects either the Always button or the Once button.

In block 1112, the application/web page for the selected routing link is accessed. Additionally, the user's selection is stored for future link handling. For example, the user device and/or a server that handles multi-link selection may store handling data according to the user's selection. In a specific example, if the user selects the Always button, the handling data (e.g., Brand ID) may be stored along with the application name/ID associated with the selected routing link. In the case of FIG. 10B, the stored handling data and application name/ID may indicate the user's preference for using the specific application to handle Brand X. The stored handling data and application name/ID may be referenced for future multi-link handling.

In block 1114, the user device may handle future multi-links according to the user's previous selection. For example, if the user selected the Once button, the user device may handle multi-links in a typical manner described herein. If the user selected the Always button, upon selection of a future multi-link, the user device and/or server may determine whether the handling data in the future multi-link (e.g., a Brand ID or other ID) is associated with an application name/ID. If the handling data is associated with an application name/ID (e.g., from a previous Always selection), selection of the future multi-link will be handled with the specified application. For example, selection of the multi-link will cause the specific application to automatically launch and access the content associated with the multi-link (e.g., without providing a manual selection interface of FIG. 10B). With respect to FIG. 10B, if the user selects App1 to handle Brand X items, future multi-link selection for Brand X items may be launched by App1 automatically (e.g., without rendering the manual selection interface).

In some cases, applications for multi-links may not be installed on the user device. In these implementations, the multi-links may access websites as a fallback. In the case of always/once functionality, future selection of multi-links may access the same web domains and/or access the digital distribution platform for downloading the application. In some implementations, the user device may implement user settings for handling multi-links with always/once functionality. For example, a user may enable/disable the feature in the user settings.

Although a smartphone is illustrated as an example user device, other example user devices may include, but are not limited to, a laptop, tablet, desktop, and wearable computing devices (e.g., head mounted devices, watch devices, etc.). Other example user devices may include smart assistant devices (e.g., smart speaker devices) and appliances. Example smart speaker devices may include, but are not limited to, an AMAZON ECHO® smart speaker by Amazon.com, Inc., a GOOGLE HOME® smart speaker by Google, Inc., or an Apple HOMEPOD® smart speaker by Apple, Inc.

Different application states (e.g., pages) and webpages may be associated with different entities. An entity may refer to a person, place, or thing. For example, an entity may refer to a business, product, public figure (e.g., entertainer, politician, etc.), service, media content (e.g., music, video, etc.), or point of interest. In a specific example, if an e-commerce application includes an application state that sells a particular pair of shoes, the pair of shoes may be the entity that is associated with the application state. In another specific example, if a music streaming application provides an application state that plays a particular song, the song may be the entity that is associated with the application state.

Modules and data stores included in the systems and devices represent features that may be included in the systems and devices of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with a network (e.g., the Internet). The one or more computing devices of the systems may also be configured to communicate with one another (e.g., via a computer network). In some examples, the one or more computing devices of the systems may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A non-transitory computer-readable medium comprising computer-executable instructions, the computer-executable instructions causing a processing unit of a user device to:
   receive a multi-link uniform resource locator (URL) that includes multi-link URL parameters, wherein the multi-link URL parameters include a plurality of routing link URLs, wherein each of the routing link URLs is configured to route the user device to a corresponding application page, wherein each routing link URL is a reference to a different application page, and wherein each routing link URL is associated with a different application;
   receive user selection of the multi-link URL;
   in response to the user selection, rank the routing link URLs based on application installation data stored on the user device, wherein the application installation data indicates whether applications for the routing link URLs are installed on the user device;
   select a final routing link URL based on the ranking of the routing link URLs; and
   in response to selecting the final routing link URL, automatically access an application page associated with the final routing link URL.

2. The non-transitory computer-readable medium of claim 1, wherein the multi-link URL includes a multi-link identifier that identifies the multi-link URL as being a multi-link URL that is associated with a plurality of routing link URLs.

3. The non-transitory computer-readable medium of claim 1, wherein the multi-link URL indicates a specific application that is configured to rank the routing link URLs and select the final routing link URL.

4. The non-transitory computer-readable medium of claim 1, wherein the multi-link URL includes one or more identifiers that indicate a party that generated the multi-link URL.

5. The non-transitory computer-readable medium of claim 1, wherein the computer-executable instructions cause the processing unit to rank the routing link URLs based on application usage data stored on the user device, and wherein the application usage data indicates an amount of usage for applications installed on the user device.

6. The non-transitory computer-readable medium of claim 1, wherein the computer-executable instructions cause the processing unit to rank the routing link URLs based on historic user data indicating previous routing link URL selection events on the user device.

7. The non-transitory computer-readable medium of claim 1, wherein the computer-executable instructions cause the processing unit to rank the routing link URLs based on aggregate user data associated with application installation data and application usage data on a plurality of other user devices.

8. The non-transitory computer-readable medium of claim 1, wherein the multi-link URL is associated with multi-link selection data that defines at least one of routing link URL ranking operations and routing link URL selection operations, and wherein the computer-executable instructions cause the processing unit to use the multi-link selection data to at least one of rank the routing link URLs and select the final routing link URL.

9. A user device comprising:
   memory including a multi-link application; and
   a processing unit configured to execute the multi-link application, wherein executing the multi-link application causes the processing unit to:
   receive a multi-link uniform resource locator (URL) that includes multi-link URL parameters, wherein the multi-link URL parameters include a plurality of routing link URLs, each of the routing link URLs is configured to route the user device to a corresponding application page, wherein each routing link URL is a reference to a different application page, and wherein each routing link URL is associated with a different application;
   receive user selection of the multi-link URL;
   in response to the user selection, rank the routing link URLs based on application installation data stored on the user device, wherein the application installation data indicates whether applications for the routing link URLs are installed on the user device;
   select a final routing link URL based on the ranking of the routing link URLs; and
   in response to selecting the final routing link URL, automatically access an application page associated with the final routing link URL.

10. The user device of claim 9, wherein the multi-link URL includes a multi-link identifier that identifies the multi-link URL as being a multi-link URL that is associated with a plurality of routing link URLs.

11. The user device of claim 9, wherein the multi-link URL indicates a specific application that is configured to rank the routing link URLs and select the final routing link URL.

12. The user device of claim 9, wherein the multi-link URL includes one or more identifiers that indicate a party that generated the multi-link URL.

13. The user device of claim 9, wherein executing the multi-link application causes the processing unit to rank the routing link URLs based on application usage data stored on the user device, and wherein the application usage data indicates an amount of usage for applications installed on the user device.

14. The user device of claim 9, wherein executing the multi-link application causes the processing unit to rank the routing link URLs based on historic user data indicating previous routing link URL selection events on the user device.

15. The user device of claim 9, wherein executing the multi-link application causes the processing unit to rank the routing link URLs based on aggregate user data associated with application installation data and application usage data on a plurality of other user devices.

16. The user device of claim 9, wherein the multi-link URL is associated with multi-link selection data that defines at least one of routing link URL ranking operations and routing link URL selection operations, and wherein executing the multi-link application causes the processing unit to use the multi-link selection data to at least one of rank the routing link URLs and select the final routing link URL.

* * * * *